June 23, 1936.    W. HELMORE ET AL    2,045,389
INDUCTION SYSTEM FOR INTERNAL COMBUSTION ENGINES
Filed Jan. 26, 1934
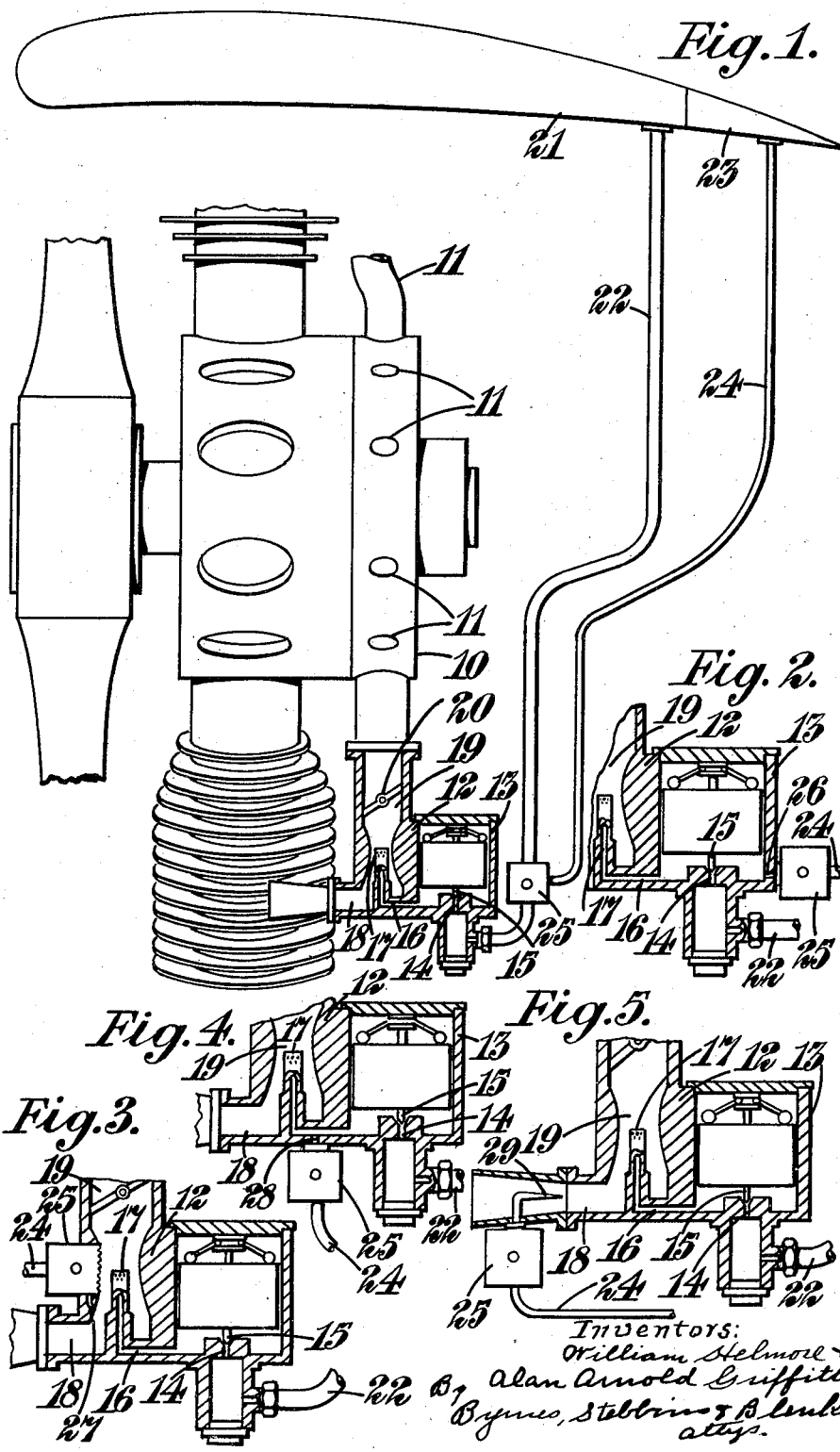

Patented June 23, 1936

2,045,389

UNITED STATES PATENT OFFICE 2,045,389

INDUCTION SYSTEM FOR INTERNAL COMBUSTION ENGINES

William Helmore and Alan Arnold Griffith, Hampshire, England, assignors to H. M. Hobson (Aircraft and Motor) Components Limited, London, England Application January 26, 1934, Serial No. 708,493
In Great Britain February 3, 1933

8 Claims. (Cl. 123—127)

This invention relates to a method or means for preventing the deposition of ice in the induction system of internal-combustion engines running on liquid fuels, particularly light hydrocarbon fuels, such as petrol. This disadvantage associated with such engines has hitherto been a serious obstacle to the satisfactory operation of engines used in aircraft where, owing to the low temperatures at which such engines must occasionally be operated, and the wide variations of humidity of the intake air, ice is readily formed in the induction system, often causing complete stoppage of the engine with serious results.

It has hitherto been the practice to overcome this difficulty by heating the induction system by water drawn from the cooling system, by hot oil drawn from the lubrication system, by exhaust gases passed round the induction system, or by heating the air prior to entering the induction system. Such methods, however, are unsatisfactory, owing to the fact that to ensure entirely against freezing, the amount of heat supplied must be sufficient to meet the most severe conditions of temperature and humidity, with the result that, in most cases, an excessive amount of heat has to be supplied, and, by this means, a considerable loss of volumetric efficiency and engine power results. Further, the heating of the induction system tends to promote detonation.

According to the present invention, a method of preventing detrimental ice formation in the induction system of an internal-combustion engine for aircraft consists in periodically causing an anti-freezing substance to be dispersed in said induction system when freezing conditions prevail. Preferably, an anti-freezing substance is selected which has a strong affinity for moisture and which in combining with moisture present in the induction system depresses the freezing temperature of the moisture. It is also of advantage to introduce the anti-freezing substance into the induction system in a finely divided state.

The anti-freezing substance may comprise a hydroxyl derivative of hydrocarbon and preferably a derivative which contains less than three hydroxyl groups such as an alcohol, for example methyl alcohol, ethyl alcohol, or butyl alcohol, or glycol or fusel oil or mixtures of these substances. The hydroxyl derivatives of hydrocarbons containing less than three hydroxyl groups are mostly mobile fluids which may readily be introduced into the induction system.

The introduction of anti-freezing substances in too large a proportion into the fuel may tend to lower the calorific value and otherwise deteriorate the fuel. It is found, however, under most circumstances, that only a small quantity of a hydroxyl derivative of a hydrocarbon requires to be present in order to prevent detrimental ice formation; for example from 2% to 15% by volume of the liquid fuel is found to be sufficient.

A feature of the invention consists in that the anti-freezing substance may be dispersed in the fuel air mixture by atomization through a jet, for example through the fuel jet. For this purpose, the anti-freezing substance may be introduced in the fuel stream at a location between the source of fuel supply and the fuel jet.

In an induction system embodying a carburetter, the anti-freezing substance may be introduced independently of the fuel into the carburetter either at a location between the float chamber and the fuel jet or directly into the float chamber, or into the mixing chamber for the fuel and air, or into the air inflow pipe to the carburetter.

A further feature of the invention consists in that the anti-freezing substance is fed at a controlled rate (e. g. by gravity) through a cock controlled by the operator or is fed by a metering device, such as a float-controlled or diaphragm-controlled valve for a mechanically operated pump.

In the case of the provision of a cock under the control of the operator for controlling the flow of the liquid anti-freezing substance, a method of keeping the induction system clear of detrimental ice formation according to the present invention includes periodically feeding the liquid anti-freezing substance to the induction system by manipulation of said cock.

It has been found that the anti-freezing substance performs an additional function to that of preventing ice formation in that should any ice be formed in the induction system under very severe conditions, it is non-adherent in character and may be readily blown from the throttle and induction-pipe surfaces by opening the throttle and increasing the velocity of the air-flow. Thus, any ice which may be formed is less permanently obstructive to the induction system. Should, for some reason, ice be formed which adheres to the walls of the induction system, a method of removing it according to this invention consists in flushing the system temporarily with a supply of anti-freezing substance in a greater proportion to that referred to above. For this purpose, a cock under direct control of the operator is particularly useful.

The following is a description of a number of alternative methods of carrying the invention into effect as applied to the induction system of an aeroplane engine, reference being made to the accompanying drawing, in which—

Figure 1 is a diagrammatic view of the general lay-out of the induction system and the means for feeding fuel and an anti-freezing substance thereto;

Figures 2, 3, 4 and 5 show alternative arrangements for feeding the anti-freezing mixture to the carburetter.

Like reference numerals refer to like parts throughout the figures of the drawing.

The induction system is shown diagrammatically in Figure 1 and comprises an induction manifold 10 from which extends induction pipes 11 communicating with the inlet valves of the engine. The induction manifold is supplied with a fuel air mixture by a carburetter 12. The carburetter may be of any known form. The float chamber 13 receives the fuel supply through a port 14 controlled by a float operated needle valve 15. Fuel flows from the float chambers through a passageway 16 to an atomizing jet 17. Air enters the carburetter through an air-intake pipe 18 and is mixed with the fuel in the mixing chamber 19. The flow of fuel air mixture to the induction manifold is controlled by a throttle valve 20. Fuel, such as petrol, is fed to the carburetter from a main fuel tank 21 through a suitable conduit 22. The parts so far described conform to general practice. In Figure 1 the main fuel tank is diagrammatically shown as being located within a wing section. A smaller tank 23 for the supply of anti-freezing substance is also shown as being located in the wing section. It will be appreciated, however, that both these tanks may be arranged on other parts of the machine, such as in the nacelle for the engine.

The anti-freezing substance is conveyed from the supply tank 23 by a pipe-line 24 through a control cock and/or a metering device shown diagrammatically at 25 and is introduced into the fuel stream on its way to the carburetter. When a control cock is employed, the manipulating means are placed in easy reach of the pilot of the aeroplane, and is arranged so that the pilot can as occasion may arise, either flush the induction system with a supply of anti-freezing substance or set the cock so that a small quantity of anti-freezing mixture is continuously fed to the system. The supply of anti-freezing can be entirely cut off by the cock when not required.

Instead of, or in addition to, the cock a metering device may be provided which metering device may comprise a float-controlled valve similar to that used in the carburetter, or a pump such as a diaphragm pump operated by the engine.

In the arrangement shown in Figure 2, the pipe-line 24 is arranged to feed the anti-freezing substance through the control cock and/or metering device direct to the float chamber of the carburetter through a suitable port 26.

In the arrangement shown in Figure 3, the anti-freezing substance is fed through a jet 27 into the mixing chamber 19 for the fuel and air. The metering device 25 is arranged to be influenced by the pressure in the mixing chamber so that with an increased throttle opening the supply of fuel and anti-freezing substance will be proportionately increased.

In the arrangement shown in Figure 4, the anti-freezing substance is fed into the passageway 16 between the float chamber and the fuel jet through a small conduit 28.

In the arrangement shown in Figure 5, the anti-freezing substance is fed into the air inflow pipe 18 of the carburetter through a suitably disposed jet 29.

We claim:—

1. A method of preventing detrimental ice formation in the induction system of an internal-combustion engine for aircraft which consists in causing a small proportion of an anti-freezing substance to be dispersed in said induction system only when freezing conditions prevail.

2. A method of preventing detrimental ice formation in the induction system of an internal-combustion engine for aircraft which consists in causing a small proportion of an anti-freezing substance having an affinity for moisture to be dispersed in said induction system only when freezing conditions prevail.

3. A method of preventing detrimental ice formation in the induction system of an internal-combustion engine for aircraft which consists in causing a small proportion of an anti-freezing substance having an affinity for moisture to be dispersed in a finely divided state in a space within the said induction system only when freezing conditions prevail.

4. A method of preventing detrimental ice formation in the induction system of an internal-combustion engine for aircraft which consists in causing a small proportion of a hydroxyl derivative of hydrocarbon of the class which operates to depress the freezing point of water to be dispersed in said induction system only when freezing conditions prevail.

5. A method of preventing detrimental ice formation in the induction system of an internal-combustion engine for aircraft which consists in causing a hydroxyl derivative of hydrocarbon of the class which operates to depress the freezing point of water from 2% to 15% by volume of the fuel employed, to be dispersed in said induction system only when freezing conditions prevail.

6. A method of preventing detrimental ice formation in the induction system of an internal-combustion engine for aircraft, which consists in causing a small proportion of a hydroxylated derivative of hydrocarbon of the class which operates to depress the freezing point of water having less than three hydroxyl groups to be dispersed in said induction system when freezing conditions prevail.

7. A method of preventing detrimental ice formation in the induction system of an internal-combustion engine for aircraft, which consists in causing a small proportion of an alcohol to be dispersed in said induction system only when freezing conditions prevail.

8. A method of preventing detrimental ice formation in the induction system of an internal combustion engine for aircraft, which consists in introducing a small proportion of a liquid anti-freezing substance having an affinity for moisture into the fuel and dispersing the mixture of said substance with the fuel in the induction system by atomization through a jet only when freezing conditions prevail.

WILLIAM HELMORE.
ALAN ARNOLD GRIFFITH.